United States Patent
Kim et al.

(10) Patent No.: US 11,398,238 B2
(45) Date of Patent: Jul. 26, 2022

(54) SPEECH RECOGNITION METHOD IN EDGE COMPUTING DEVICE

(71) Applicant: LG ELECTRONICS INC., Seoul (KR)

(72) Inventors: Sungjin Kim, Seoul (KR); Dongho Kim, Seoul (KR); Jingyeong Kim, Seoul (KR); Taehyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 377 days.

(21) Appl. No.: 16/487,415

(22) PCT Filed: Jun. 7, 2019

(86) PCT No.: PCT/KR2019/006904
§ 371 (c)(1),
(2) Date: Aug. 20, 2019

(87) PCT Pub. No.: WO2020/246649
PCT Pub. Date: Dec. 10, 2020

(65) Prior Publication Data
US 2021/0358502 A1    Nov. 18, 2021

(51) Int. Cl.
*G10L 15/30* (2013.01)
*G10L 15/06* (2013.01)
(Continued)

(52) U.S. Cl.
CPC ............. *G10L 15/30* (2013.01); *G10L 15/063* (2013.01); *G10L 15/183* (2013.01); *G10L 15/34* (2013.01)

(58) Field of Classification Search
CPC ........................................................ G10L 15/30
See application file for complete search history.

(56) References Cited

U.S. PATENT DOCUMENTS 5,956,683 A * 9/1999 Jacobs ............... G10L 15/30
704/E15.047
6,633,846 B1 * 10/2003 Bennett ............ G06F 16/24522
704/E15.047
(Continued)

FOREIGN PATENT DOCUMENTS

JP   2019028744   2/2019
KR   1020180109633   10/2018
KR   1020180118393   10/2018

OTHER PUBLICATIONS

PCT International Application No. PCT/KR2019/006904, International Search Report dated Mar. 4, 2020, 3 pages.
(Continued)

*Primary Examiner* — Shaun Roberts
(74) *Attorney, Agent, or Firm* — Lee Hong Degerman Kang & Waimey

(57) ABSTRACT

Disclosed herein is a speech recognition method in a distributed network environment. A method of performing a speech recognition operation in an edge computing device includes receiving a natural language understanding (NLU) model from the cloud server, storing the received NLU model, receiving voice data spoken by a user from the client device, performing a natural language processing operation on the received voice data using the NLU model, performing speech recognition according to the natural language processing operation, and transmitting a result of the speech recognition to the client device.

At least one of the edge computing device, a voice recognition device, and a server may be associated with an artificial intelligence module, a drone (an unmanned aerial vehicle (UAV)), a robot, an augmented reality (AR) device, a virtual reality (VR) device, a device related to a 5G service, and the like.

14 Claims, 13 Drawing Sheets

(51) Int. Cl.
*G10L 15/183* (2013.01)
*G10L 15/34* (2013.01)

(56) References Cited

U.S. PATENT DOCUMENTS

| | | | | |
|---|---|---|---|---|
| 6,738,743 B2* | 5/2004 | Sharma | ............... | G10L 15/30 704/E15.047 |
| 7,013,275 B2* | 3/2006 | Arnold | ............... | G10L 15/30 704/E15.047 |
| 7,295,981 B1* | 11/2007 | Gupta | ............... | G10L 15/063 704/257 |
| 8,019,608 B2* | 9/2011 | Carraux | ............... | G10L 15/30 704/270.1 |
| 9,619,202 B1* | 4/2017 | Weingartner | ............... | G10L 13/08 |
| 10,068,174 B2 | 9/2018 | Aili et al. | | |
| 10,176,809 B1 | 1/2019 | Pierard | | |
| 10,599,786 B1* | 3/2020 | Malcangio | ............... | G06F 40/58 |
| 10,713,007 B2* | 7/2020 | Aiken | ............... | H04M 1/72415 |
| 2004/0002866 A1* | 1/2004 | Deisher | ............... | G10L 15/30 704/E15.047 |
| 2004/0158457 A1* | 8/2004 | Veprek | ............... | G10L 15/065 704/201 |
| 2010/0324910 A1* | 12/2010 | Chambers | ............... | G06F 40/143 704/270.1 |
| 2011/0015928 A1* | 1/2011 | Odell | ............... | G10L 15/30 704/275 |
| 2011/0112827 A1* | 5/2011 | Kennewick | ............... | G10L 15/18 704/9 |
| 2014/0136183 A1* | 5/2014 | Hebert | ............... | G06F 40/279 704/9 |
| 2014/0163977 A1* | 6/2014 | Hoffmeister | ............... | G10L 15/32 704/232 |
| 2015/0120287 A1* | 4/2015 | Stern | ............... | G10L 15/183 704/231 |
| 2017/0060848 A1* | 3/2017 | Liu | ............... | G06F 40/295 |
| 2018/0089572 A1* | 3/2018 | Aili | ............... | G06F 8/41 |
| 2019/0208007 A1* | 7/2019 | Khalid | ............... | G06F 16/178 |
| 2020/0076746 A1* | 3/2020 | Penrose | ............... | H04L 12/1822 |
| 2020/0098360 A1* | 3/2020 | Nakamae | ............... | G10L 15/22 |
| 2020/0118548 A1* | 4/2020 | Huang | ............... | G10L 15/30 |
| 2020/0193982 A1* | 6/2020 | Kim | ............... | G10L 25/84 |
| 2020/0211541 A1* | 7/2020 | Gupta | ............... | G06F 3/167 |

OTHER PUBLICATIONS

Sanfilippo, G et al., "A Concise Review of 5G New Radio Capabilities for Directional Access at mmWave Frequencies," <https://arxiv.org/abs/1812.11653>, Dec. 2018, 15 pages.

* cited by examiner

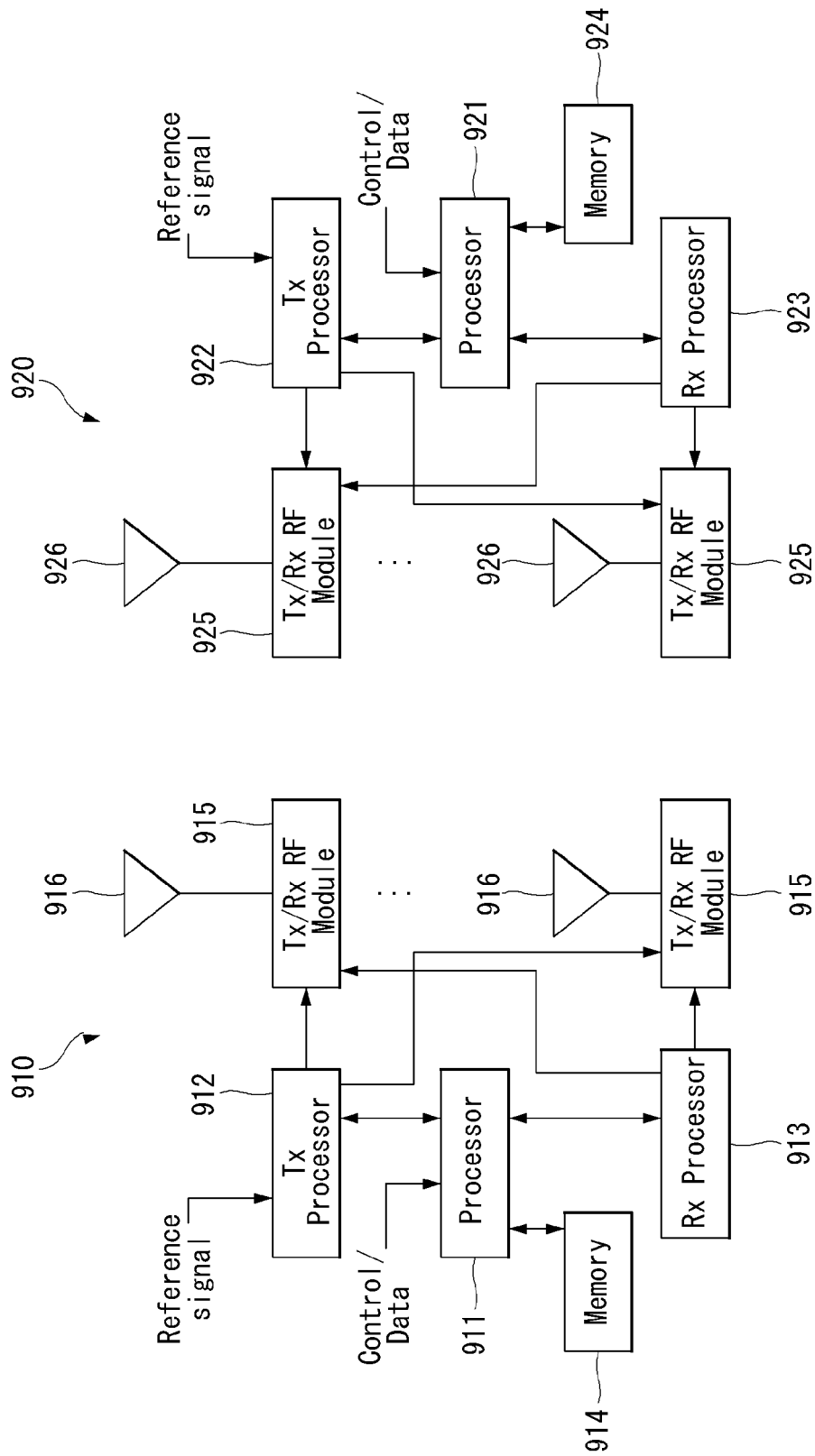
[FIG. 1]

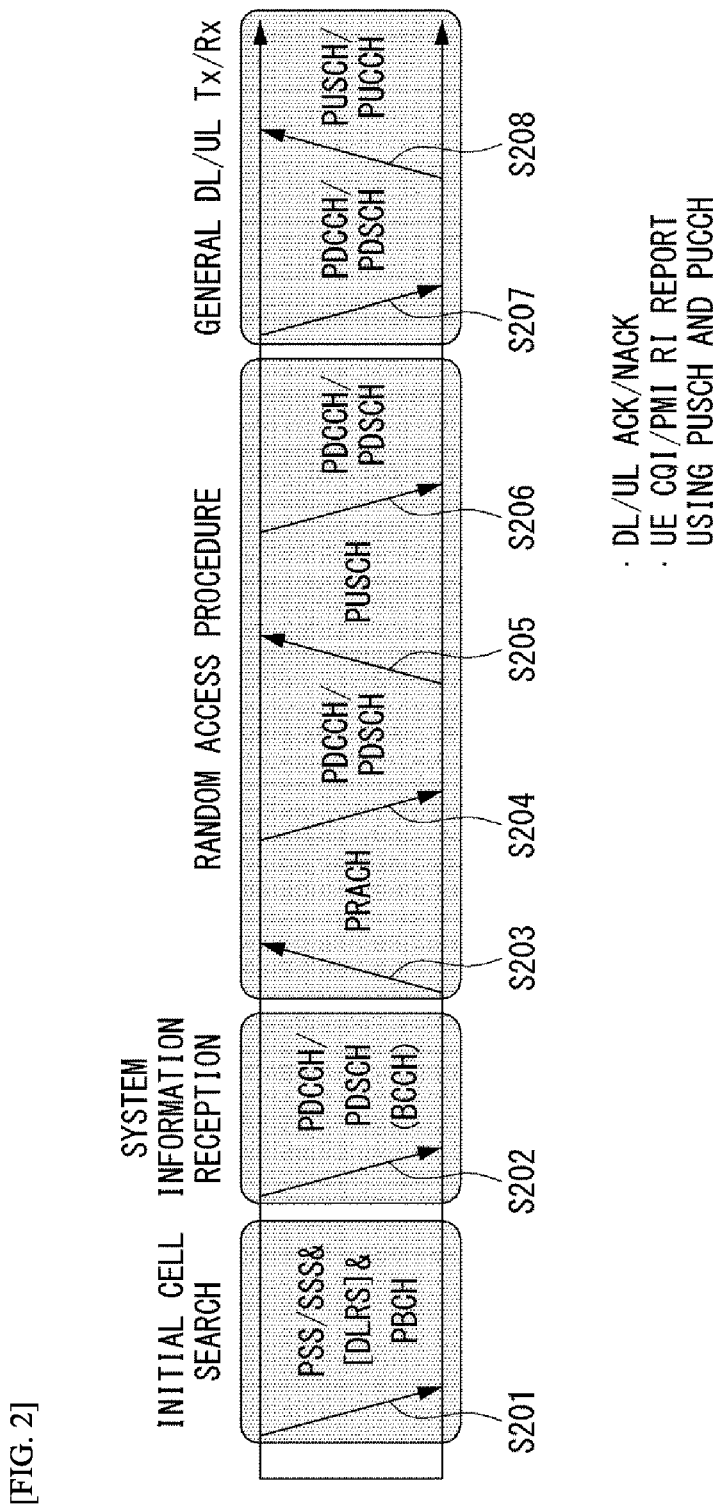
[FIG. 2]

[FIG. 3]
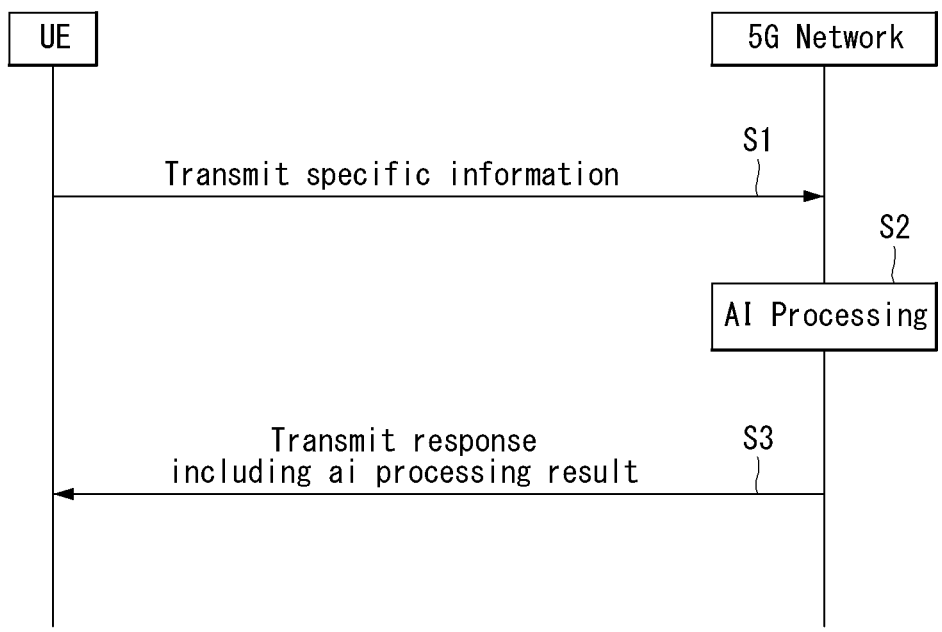

【FIG. 4】
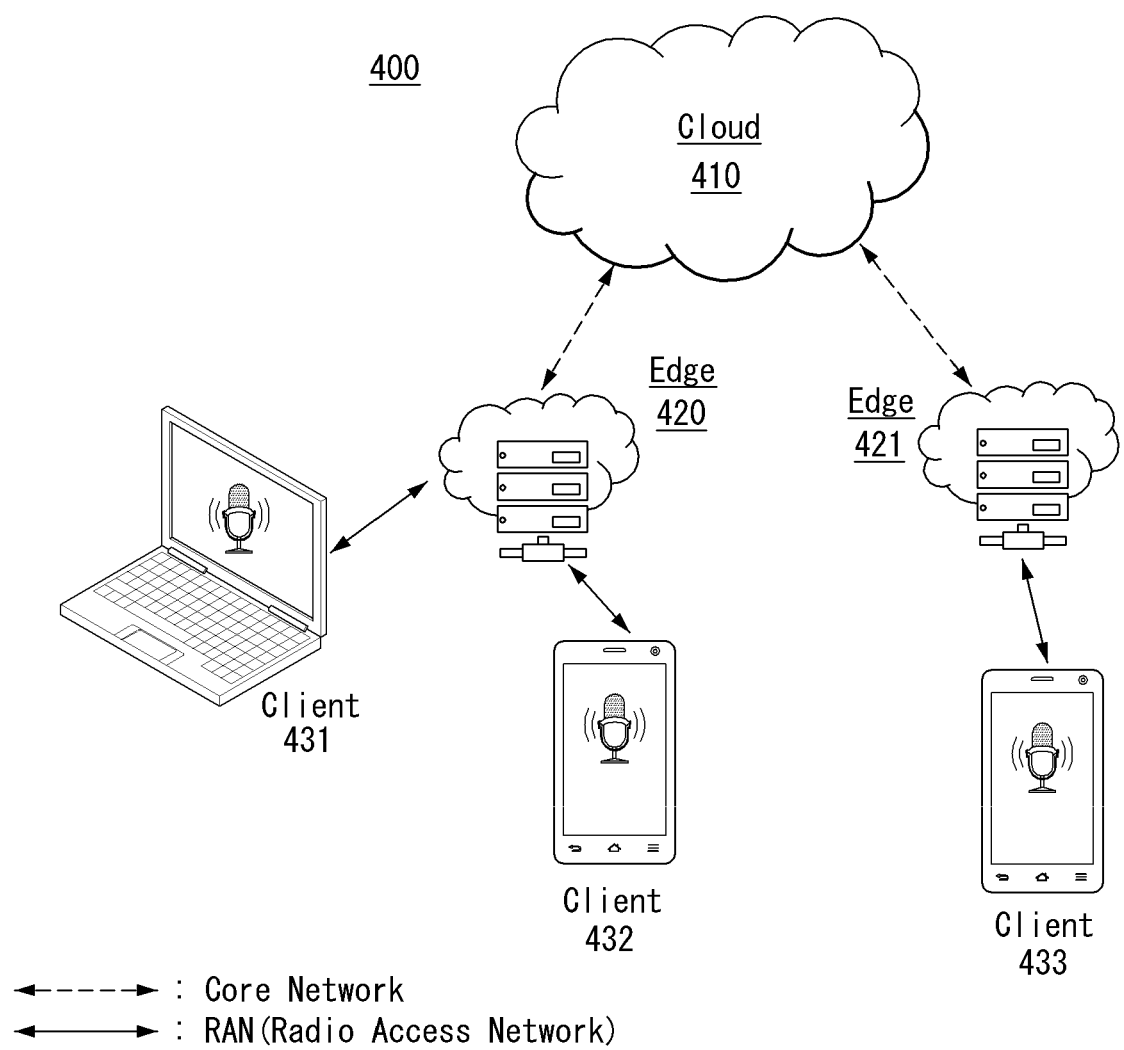

[FIG. 5]
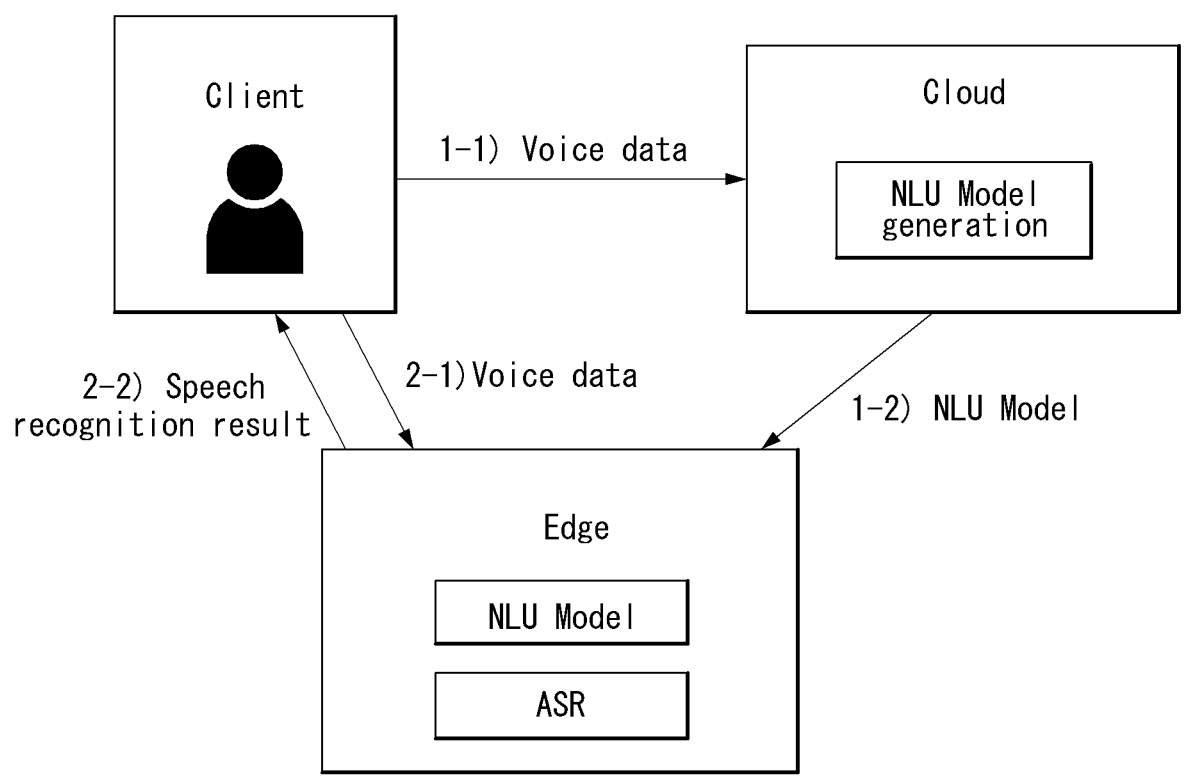

[FIG. 6]
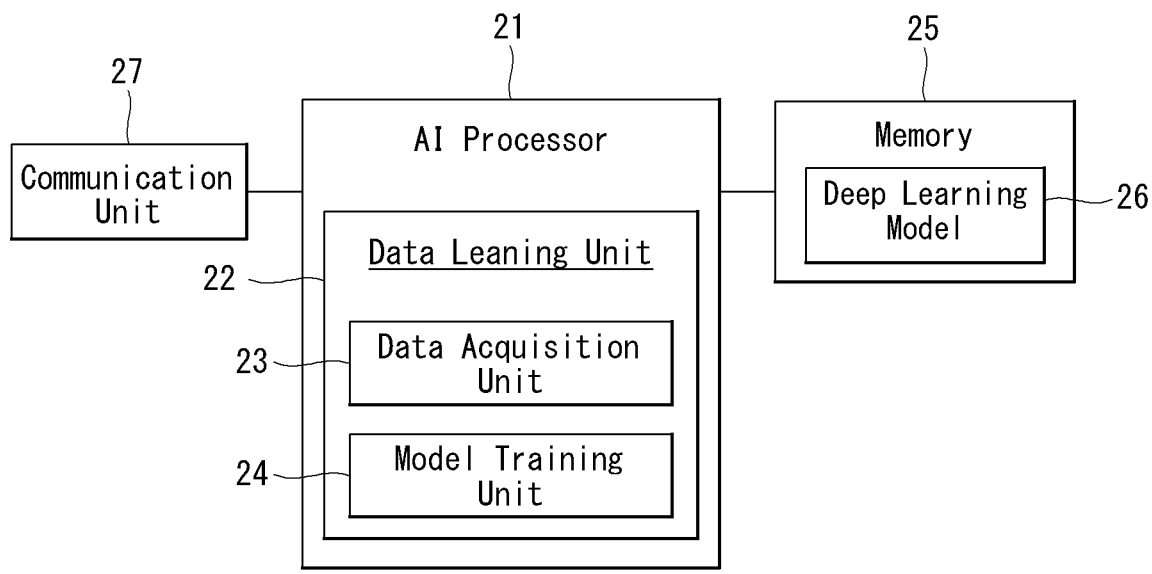

[FIG. 7]
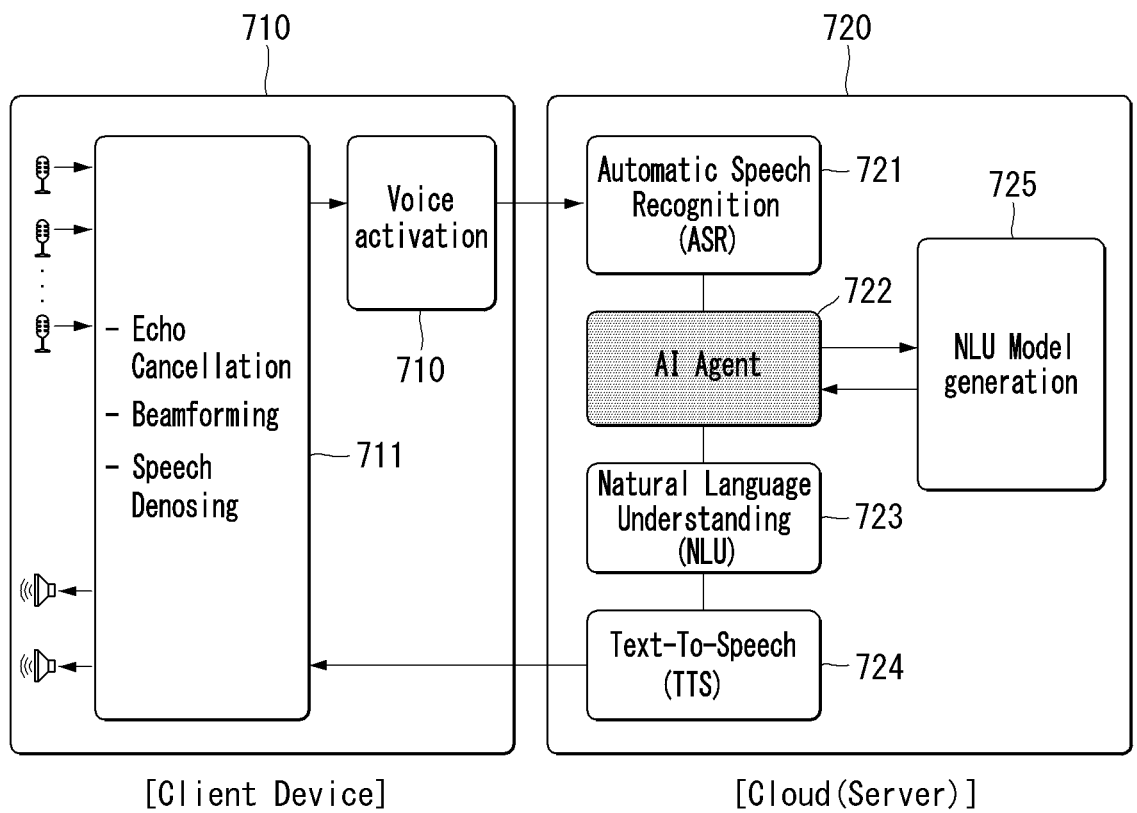

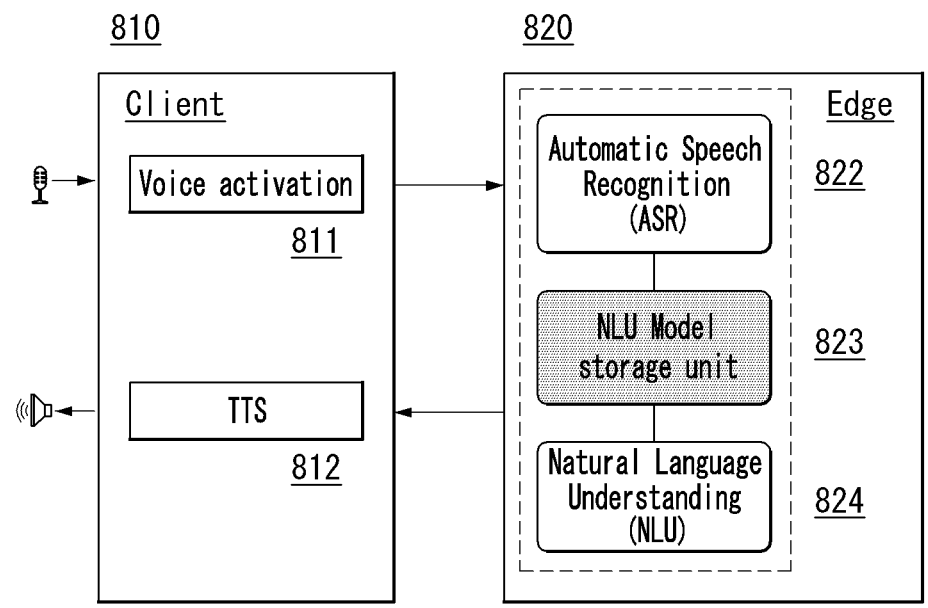
[FIG. 8]

[FIG. 9]
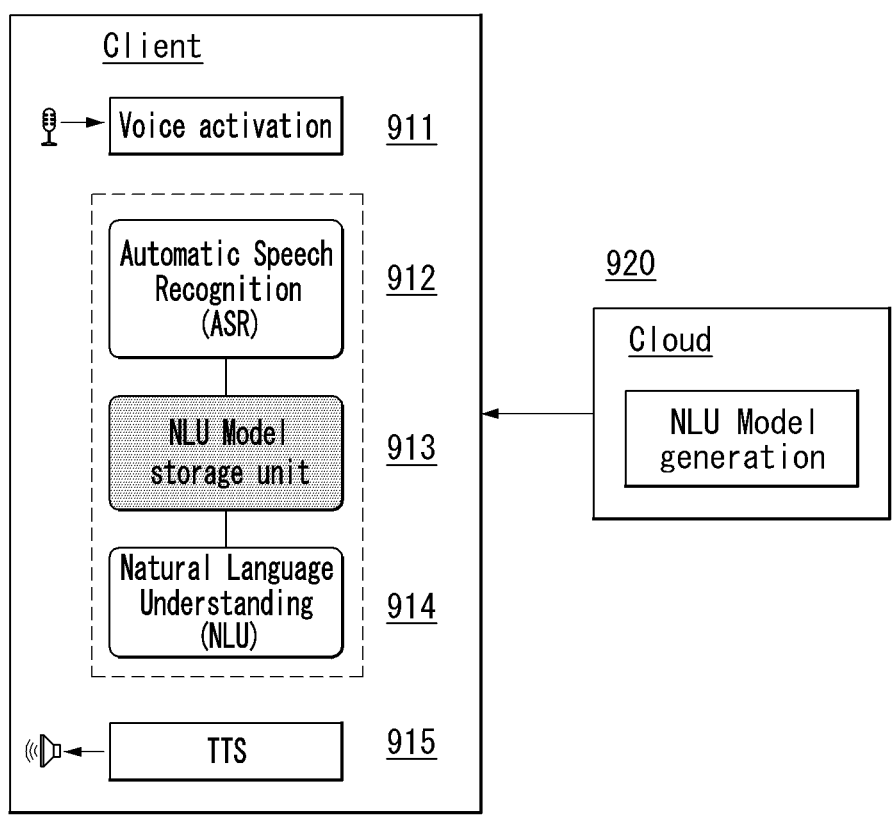

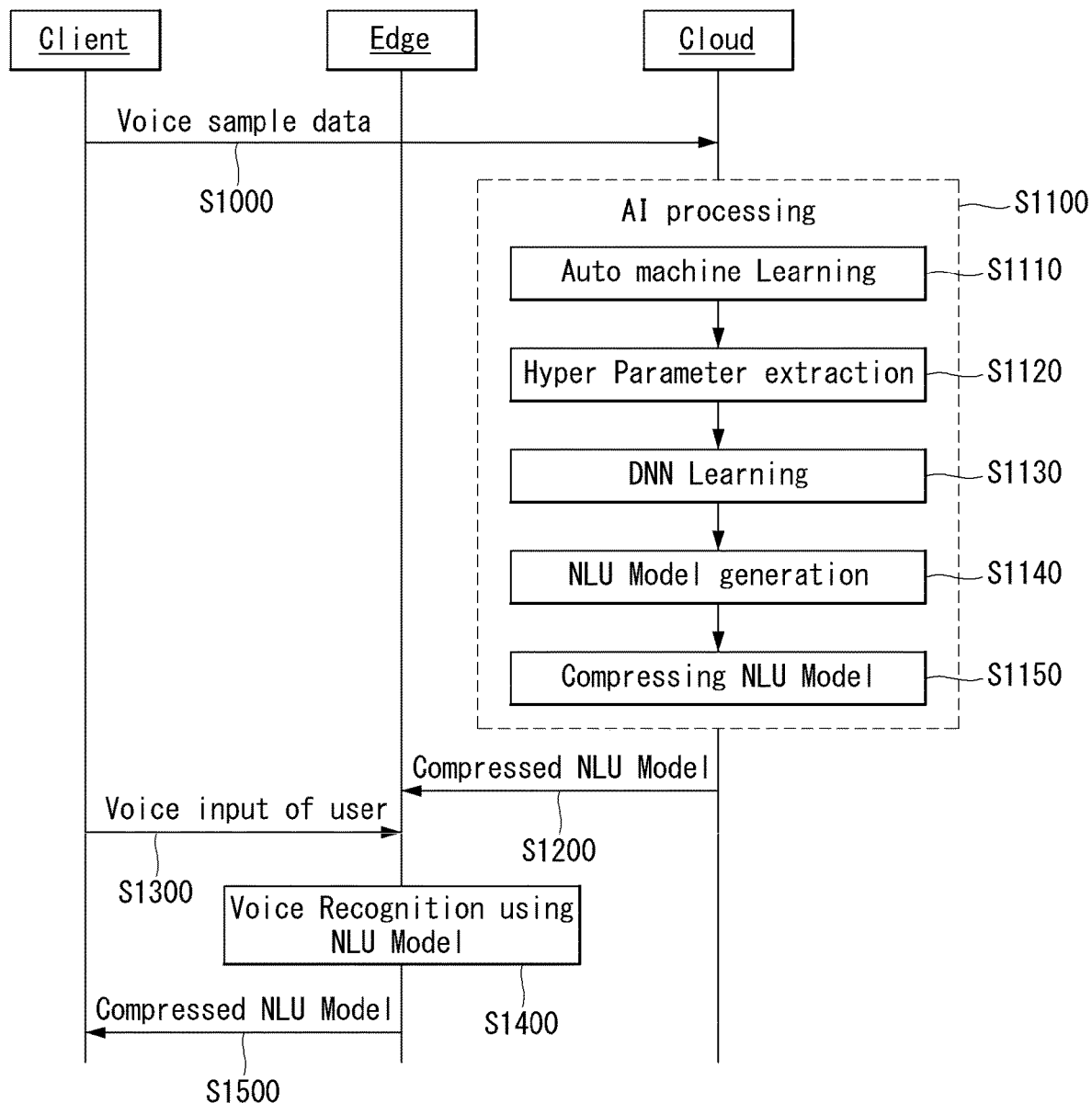

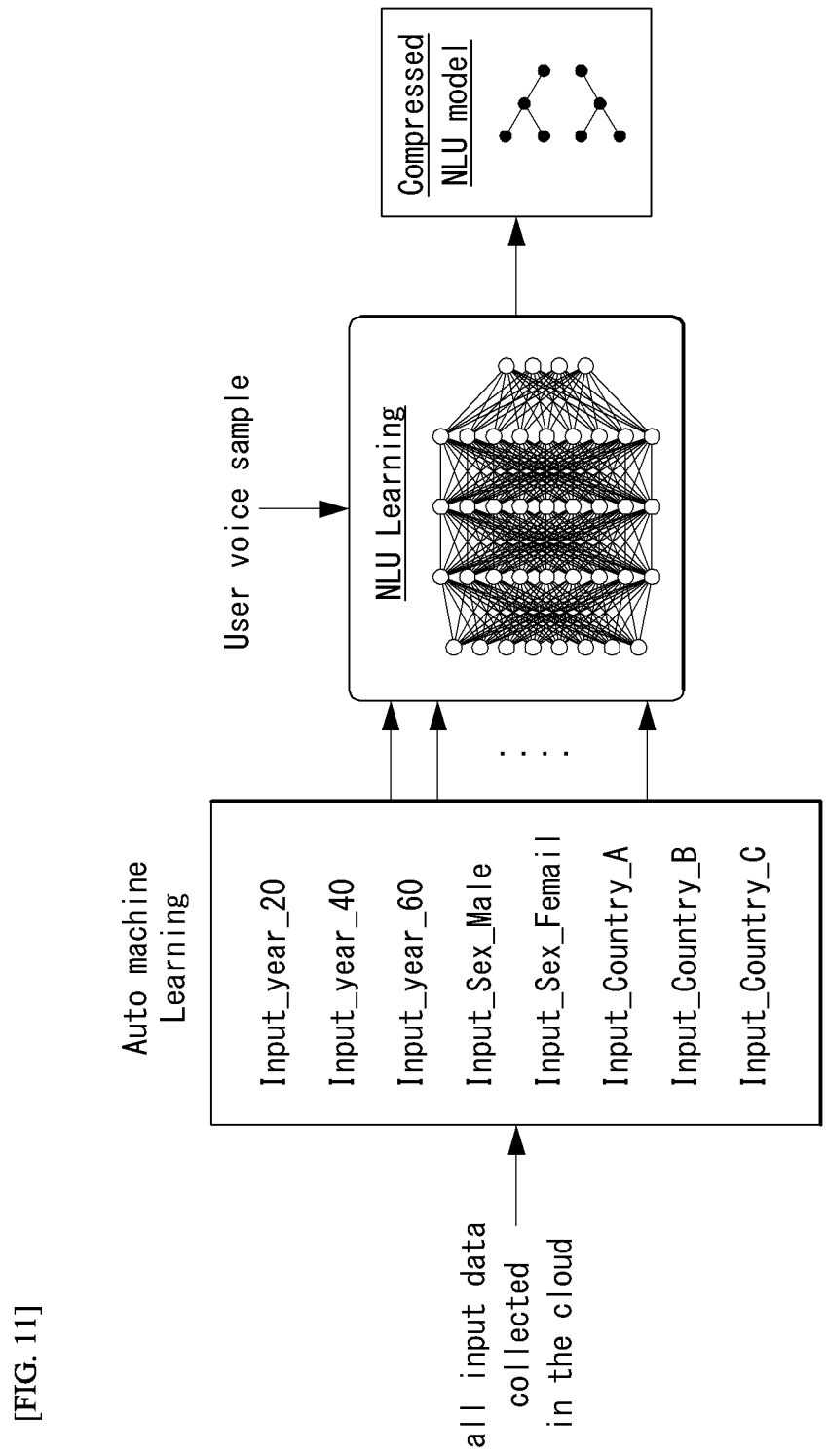

[FIG. 12]
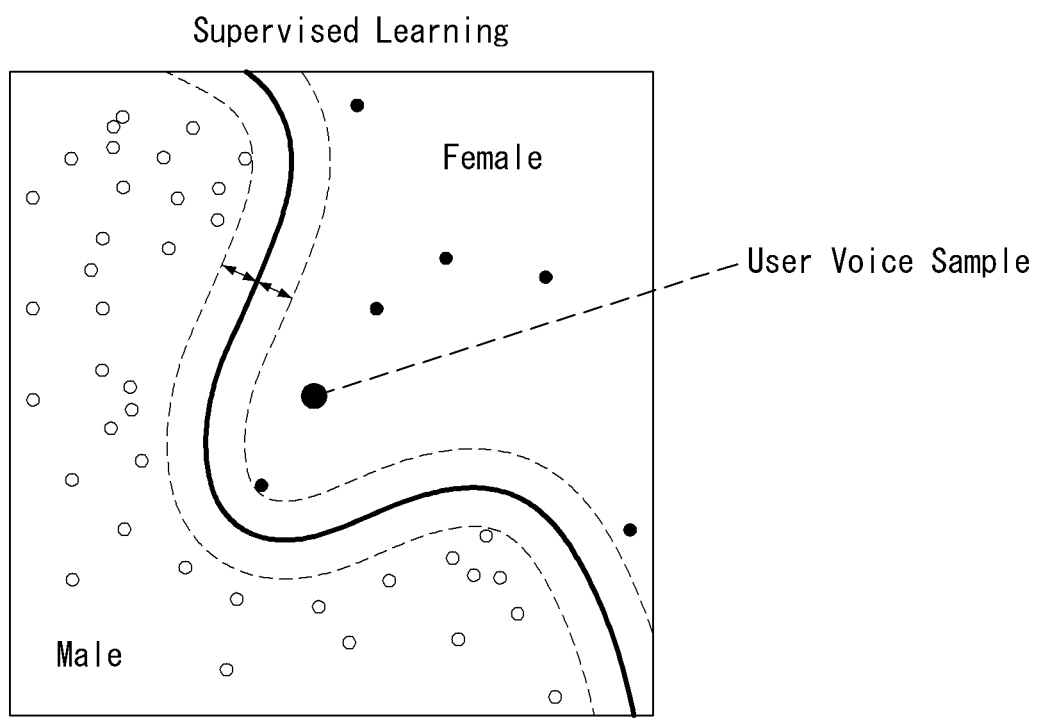

[FIG. 13]
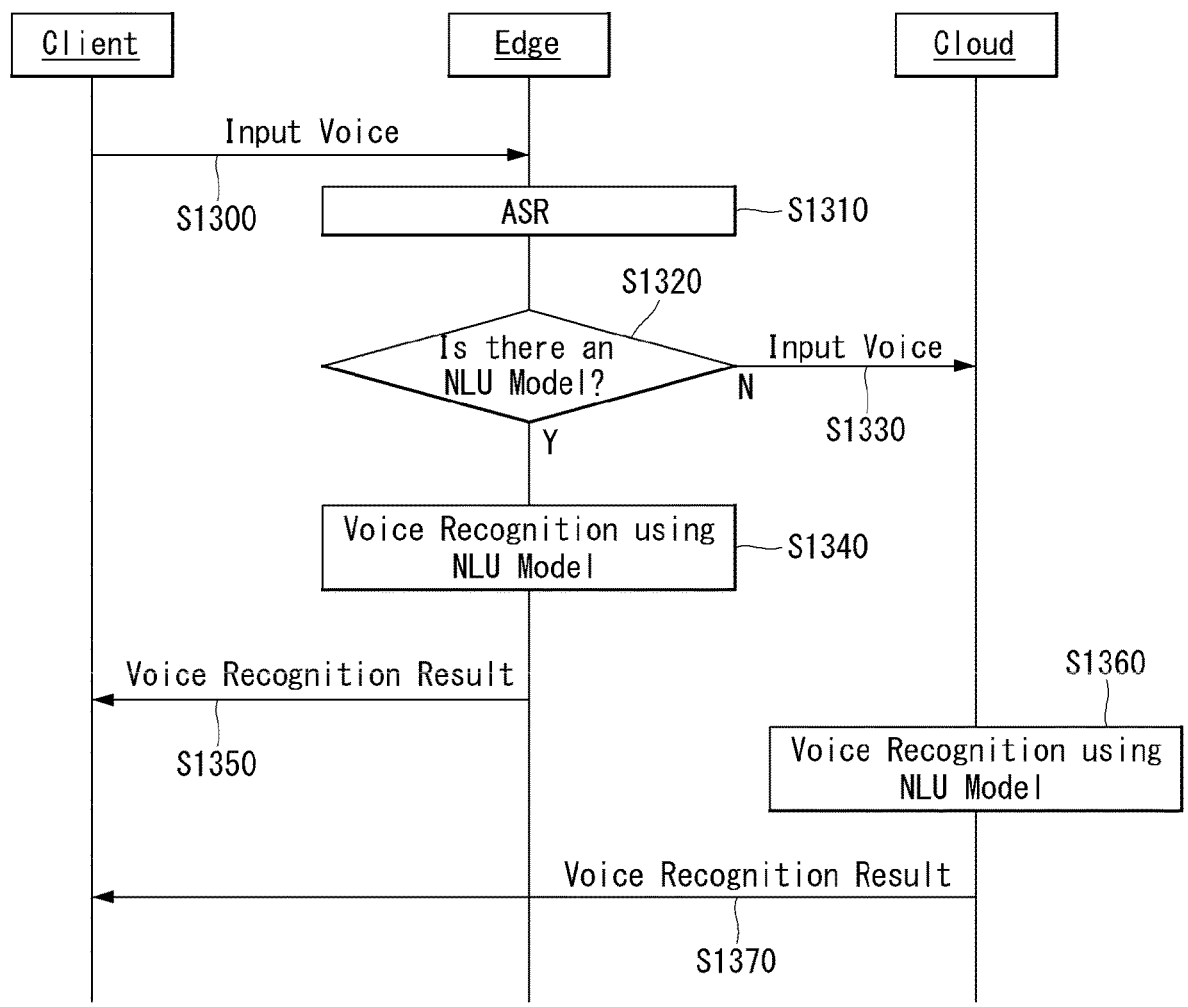

SPEECH RECOGNITION METHOD IN EDGE COMPUTING DEVICE

CROSS-REFERENCE TO RELATED APPLICATIONS

This application is the National Stage filing under 35 U.S.C. 371 of International Application No. PCT/KR2019/006904, filed on Jun. 7, 2019, the contents of which are hereby incorporated by reference herein in its entirety.

TECHNICAL FIELD

The present invention relates to a speech recognition method, and more particularly, to an adaptive speech recognition method and apparatus capable of implementing real-time speech recognition by adaptively applying a personalized speech recognition model.

BACKGROUND ART

Speech recognition is a technology for recognizing user's speech. Speech of a user may be converted into text by speech recognition. When a speech recognition error occurs in speech recognition or a word recognized first by speech recognition appears, it may be difficult to convert the input speech into accurate text to appropriately process speech recognition.

In addition, currently, speech recognition is performed in a cloud environment. In the case of a cloud-based speech recognition system, input speech must be transmitted to the cloud, and thus, there is a limitation in real-time speech recognition. In particular, if communication connection is unstable at the time of speech recognition or if there is a problem in communication connection, speech recognition itself is impossible.

DISCLOSURE

Technical Problem

The present invention aims at solving the above-mentioned needs and/or problems.

An embodiment of the present invention provides a speech recognition method of enabling a real-time speech recognition by allowing an edge computing device to perform a speech recognition operation between a client device that inputs a voice command and a cloud server.

Furthermore, an embodiment of the present invention provides a speech recognition method of allowing an edge computing device to perform a speech recognition operation in a state where the edge computing device downloads an NLU model generated in a cloud environment, thereby solving a problem that speech recognition performance is deteriorated due to communication failure.

Furthermore, an embodiment of the present invention provides a speech recognition method of allowing a device end to process a voice command of a pattern frequently used by a user, thereby enabling efficient real-time speech recognition.

Technical Solution

A speech recognition method in an edge computing device according to an aspect of the present invention may be performed in a distributed network system including a client device, the edge computing device, and a cloud server.

The method of performing a speech recognition operation in the edge computing device includes: receiving a natural language understanding (NLU) model from the cloud server; storing the received NLU model; receiving voice data spoken by a user from the client device; performing a natural language processing operation on the received voice data using the NLU model; performing speech recognition according to the natural language processing operation; and transmitting a result of the speech recognition to the client device.

The NLU model may be a user-personalized NLU model generated by analyzing a voice command pattern of the user.

The NLU model may be generated by the cloud server and then received from the cloud server as having a size in a compressed state on the basis of the voice command pattern of the user.

The speech recognition method may further include: performing an auto speech recognition (ASR) operation if the voice data is received from the client device; determining whether an NLU model enabling speech recognition processing on text generated text by performing the ASR operation exists; and performing the natural processing operation using the NLU model if the NLU model exists.

The speech recognition method may further include: transmitting the voice data received from the client device to the cloud server if the NLU model does not exist.

The edge computing device may include an AI module, and the ASR operation and the natural language processing operation may be performed through the AI module.

The speech recognition method may further include: performing an initial access procedure with the client device by periodically transmitting a synchronization signal block (SSB); performing a random access procedure with the client device; transmitting an uplink (UL) grant to the client device for scheduling transmission of the voice data; and receiving the voice data from the client device on the basis of the UL grant.

The performing of a random access procedure may include: receiving a physical random access channel (PRACH) preamble from the client device; and transmitting a response to the PRACH preamble to the client device.

The performing of a random access procedure may further include: performing a downlink beam management (DL BM) procedure using the SSB.

The performing of a DL BM procedure may include: transmitting a CSI-ResourceConfig IE including a CSI-SSB-ResourceSetList to a user equipment (UE); transmitting a signal on SSB resources to the client device; and receiving a best SSBRI and a corresponding RSRP from the client device.

The speech recognition method may further include: transmitting configuration information of a reference signal related to beam failure detection to the client device; and receiving a PRACH preamble requesting beam failure recovery from the client device.

A method for generating a natural language understanding (NLU) model in a cloud server according to another aspect of the present invention may be implemented in a distributed network system including a client device, an edge computing device, and the cloud server. The method for generating an NLU model in the cloud server includes: receiving voice data spoken by a user from the client device; defining a rule for generating an NLU model by analyzing a voice pattern of the user from the voice data; training the NLU model using a plurality of pieces of voice data collected in the cloud server on the basis of the rule, as input data; generating the NLU model according to a training result; compressing the NLU model to a predetermined size according to the voice pattern of the user; and transmitting the compressed NLU model to the edge computing device.

The training of the NLU model may be performed through automated machine learning AutoML, and the AutoML may include: performing a preprocessing process on the plurality of pieces of voice data collected in the cloud server; and generating the input data for training the NLU model by classifying the plurality of pieces of voice data collected in the cloud server as a result of the preprocessing according to a predetermined criterion.

The predetermined criterion may include attribute information of each of the plurality of pieces of voice data collected in the cloud server, and the attribute information may include at least one of age, sex, and area.

A speech recognition system according to another aspect of the present invention includes: a cloud server receiving first voice data spoken by a user from a client device and generating a natural language understanding (NLU) model based on a rule defined on the basis of a voice pattern of the user analyzed from the first voice data; and an edge computing device receiving the NLU model generated by the cloud server and compressed according to a predetermined criterion and performing a natural language processing operation on second voice data by applying the NLU model if the second voice data is received from the client device.

The edge computing device may transmit the second voice data to the cloud server if it is determined that the natural language processing operation cannot be performed on the second voice data by applying the NLU model.

An electronic device, as an edge computing device, according to another aspect of the present invention includes: one or more processors; a memory; and one or more programs, wherein the one or more programs are stored in the memory and configured to be executed by the one or more processors, and the one or more programs include an instruction for performing the speech recognition method in the edge computing device described above.

An electronic device, as a cloud computing device, according to another aspect of the present invention includes: one or more processors; a memory; and one or more programs, wherein the one or more programs are stored in the memory and configured to be executed by the one or more processors, wherein the one or more programs include an instruction for performing the NLU model generating method in the cloud server described above.

A recording medium for performing an edge computing operation according to another aspect of the present invention, as a non-transitory computer-readable medium storing a computer-executable component configured to be executed in one or more processors of a computing device, wherein the computer-executable component receives a natural language understanding (NLU) model from a cloud server, stores the received NLU model, receives voice data spoken by a user from the client device, performs a natural language processing operation on the received voice data using the NLU model, performs speech recognition according to the natural language processing operation, and transmits a result of the speech recognition to the client device.

A recording medium operating in a cloud server according to another aspect of the present invention, as a non-transitory computer-readable medium storing a computer-executable component configured to be executed in one or more processors of a computing device, wherein the computer-executable component receives voice data spoken by a user from a client device, defines a rule for generating a natural language understanding (NLU) model by analyzing a voice pattern of the user from the voice data, trains the NLU using a plurality of pieces of voice data collected in the cloud server on the basis of the rule, as input data, generates the NLU model according to the training result, compresses the NLU model to a predetermined size according to the voice pattern of the user, and transmits the compressed NLU model to the edge computing device.

According to the present invention, the edge computing device between a client device inputting a voice command and a cloud server performs a speech recognition operation, thus enabling real-time speech recognition.

Further, according to the present invention, in a state where the edge computing device downloads the NLU model generated in a cloud environment, the edge computing device performs a speech recognition operation, thereby solving a problem that performance of speech recognition is deteriorated due to communication failure.

Further, according to the present invention, a voice command of a pattern frequently used by a user may be processed at a device end, thereby enabling efficient real-time speech recognition.

DESCRIPTION OF DRAWINGS

The accompanying drawings, which are included as part of the detailed description in order to provide a thorough understanding of the present invention, provide examples of the present invention and together with the description, describe the technical features of the present invention.

FIG. 1 is a block diagram of a wireless communication system to which methods proposed in the disclosure are applicable.

FIG. 2 shows an example of a signal transmission/reception method in a wireless communication system.

FIG. 3 shows an example of basic operations of an user equipment and a 5G network in a 5G communication system.

FIG. 4 is a block diagram of a schematic system in which an adaptive speech recognition method according to an embodiment of the present invention is implemented.

FIG. 5 is a conceptual diagram illustrating a speech recognition operation performed in a cloud distributed network system according to an embodiment of the present invention.

FIG. 6 is a block diagram of an AI device applicable to embodiments of the present invention.

FIG. 7 illustrates a voice processing process performed in a cloud environment or a server environment.

FIG. 8 is a block diagram illustrating a voice processing operation between a client and an edge according to an embodiment of the present invention.

FIG. 9 is a block diagram illustrating a voice processing operation between a client and a cloud according to an embodiment of the present invention.

FIG. 10 is a data flowchart for implementing an adaptive speech recognition method in a cloud distributed network system according to an embodiment of the present invention.

FIGS. 11 to 12 illustrate a process of generating a natural language understanding (NLU) model by applying Auto ML.

FIG. 13 is a data flowchart for applying an adaptive speech recognition method according to an embodiment of the present invention.

The accompanying drawings, which are included to provide a further understanding of the invention and are incorporated in and constitute a part of the specification, illustrate embodiments of the invention and, together with the description, serve to explain the technical features of the invention.

MODE FOR INVENTION

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

FIG. 1 is a block diagram of a wireless communication system to which methods proposed in the disclosure are applicable.

Referring to FIG. 1, a device (autonomous device) including an autonomous module is defined as a first communication device (910 of FIG. 1), and a processor 911 can perform detailed autonomous operations.

A 5G network including another vehicle communicating with the autonomous device is defined as a second communication device (920 of FIG. 1), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC CONNECTED.

A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.
  The UE repeatedly receives signals on resources in a CSI-RS resource set in which the RRC parameter 'repetition' is set to 'ON' in different OFDM symbols through the same Tx beam (or DL spatial domain transmission filters) of the BS.
  The UE determines an RX beam thereof
  The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
  The UE receives signals on resources in a CSI-RS resource set in which the RRC parameter 'repetition' is set to 'OFF' in different DL spatial domain transmission filters of the BS.
  The UE selects (or determines) a best beam.
  The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by servingCellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present invention which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present invention which will be described later and applied or can complement the methods proposed in the present invention to make technical features of the methods concrete and clear.

FIG. 4 is a block diagram of a schematic system in which an adaptive speech recognition method according to an embodiment of the present invention is implemented.

Referring to FIG. 4, a speech recognition method according to an embodiment of the present invention may be implemented in a cloud computing system 400. The cloud computing system 400 may provide a distributed cloud environment. The distributed cloud environment may include a cloud environment 410, edge environments 420 and 421, and client environments 431, 432, and 433. The cloud environment 410 may include a cloud server, and the edge environments 420 and 421 may include an edge server or an edge device. The client environments 431, 432, and 433 may include a speech recognition terminal that provides a user with a speech recognition service in which an adaptive speech recognition method is implemented according to an embodiment of the present invention.

The cloud 410 may be directly connected to the cloud server to form a cloud server through a control operation of the cloud server to manage the cloud service.

The edge 420 is configured by adding a computing resource to a cloud network device and is mainly managed by a network provider such as a communication company. However, the edge 420 may also be configured by adding a computing resource to an individual router. The edge 420 may receive a personalized speech recognition model from the cloud 410 and stored the same.

The client terminals 431, 432, and 433 receive speech spoken by the user and transmit the input voice data to the edge 420. The edge 420 may perform a speech recognition operation on a voice received by the client terminal using the personalized speech recognition model, and transmit a result to the client terminal.

Accordingly, a load of a network resource may be minimized by distributing the speech recognition operation requested by the client terminal for the cloud environment to the edge environment.

Meanwhile, it is described that the edge 420 environment is located between the client terminal and the cloud, but a function of the edge 420 may be embedded in the client terminal. In this case, a problem that the speech recognition operation itself is impossible as communication connection with the cloud and/or the edge is unstable at the time when the client terminal receives a voice input or communication connection itself has a problem may be minimized.

FIG. 5 is a conceptual diagram illustrating a speech recognition operation in a cloud distributed network system according to an embodiment of the present invention.

Referring to FIG. 5, an adaptive speech recognition method according to an embodiment of the present invention may include: 1) generating an NLU model; 2) transferring the generated NLU model to an edge environment; and 3) providing a service based on the speech recognition process to a client using the NLU model transferred to the edge environment.

First, in order to generate the NLU model, voice data input by the user is necessary. Accordingly, the client device transmits the input voice data of the user to the cloud environment (1-1). Then, in the cloud environment, an NLU model is generated on the basis of numerous voice data collected in the cloud environment and received voice samples of the user. The cloud transmits the generated NLU model to an edge device (1-2).

The edge device stores the NLU model received from the cloud. Thus, when voice data for voice processing is received from the client device (2-1), the edge device performs an ASR operation. The edge device may infer an intension of the user by applying the NLU model to the text data based on the result of ASR through the NLU model stored therein, without transmitting the received voice data to the cloud. The edge device may transmit the speech recognition result to the client device (2-2).

FIG. 6 is a block diagram of an AI device applicable to embodiments of the present invention.

The AI device 20 may include an electronic device including an AI module capable of performing AI processing or a server including the AI module. In addition, the AI device 20 may be included as at least a portion of the configuration of the speech recognition device to perform at least a portion of AI processing.

The AI processing may include all operations related to speech processing (speech recognition and speech synthesis).

The AI device 20 may include an AI processor 21, a memory 25, and/or a communication unit 27.

The AI device 20, which is a computing device capable of learning a neural network, may be implemented as various electronic devices such as a server, a desktop PC, a notebook PC, a tablet PC, and the like.

The AI processor 21 may learn the neural network using a program stored in the memory 25.

In particular, the AI processor 21 may learn the neural network to generate a user-personalized NLU model by analyzing a voice command of the user who speaks. Here, a neural network for generating an optimized NLU model may be designed to simulate the human brain structure on a computer and include a plurality of weighted network nodes that simulate neurons of a human neural network.

The plurality of network nodes may transmit and receive data according to connection relationships, respectively, to simulate a synaptic activity of the neurons exchanging signals through synapses. Here, the neural network may include a deep learning model developed from a neural network model. In the deep learning model, a plurality of network nodes may be located on different layers and exchange data according to convolution connection relationships. Examples of neural network models include various deep learning techniques such as deep neural networks (DNN), convolutional deep neural networks (CNN), recurrent Boltzmann machine (RNN), restricted Boltzmann machine (RBM) deep belief networks (DBN), deep-Q-network, and may be applied to fields such as computer vision, speech recognition, natural language processing, voice/signal processing, and the like.

Meanwhile, the processor performing the function described above may be a general-purpose processor (e.g., a CPU) or may be an AI-specific processor (e.g., a GPU) for artificial intelligence learning.

The memory 25 may store various programs and data necessary for the operation of the AI device 20. The memory 25 may be implemented as a nonvolatile memory, a volatile memory, a flash memory, a hard disk drive (HDD), or a solid state drive (SDD). The memory 25 may be accessed by the AI processor 21 and data may be read/written/modified/deleted/updated by the AI processor 21 from the memory 25. The memory 25 may also store a neural network model (e.g., a deep learning model 26) generated through a learning algorithm for data classification/recognition in accordance with an embodiment of the present invention.

Meanwhile, the AI processor 21 may include a data learning unit 22 that learns a neural network for data classification/recognition. The data learning unit 22 may learn criteria regarding what learning data is to be used to determine data classification/recognition and how data is classified and recognized using learning data. The data learning unit 22 may obtain learning data to be used for learning and apply the obtained learning data to the deep learning model, thereby learning the deep learning model.

The data learning unit 22 may be manufactured in the form of at least one hardware chip and mounted in the AI device 20. For example, the data learning unit 22 may be fabricated in the form of a dedicated hardware chip for artificial intelligence (AI) or may be manufactured as a part of a general-purpose processor (CPU) or a graphics-only processor (GPU) and mounted in the AI device 20. The data learning unit 22 may be implemented as a software module. When the data learning unit 22 is implemented as a software module (i.e., program module including instructions), the software module may be stored in a non-transitory computer-readable medium. In this case, at least one software module may be provided by an operating system (OS) or by an application.

The data learning unit 22 may include a learning data obtaining unit 23 and a model learning unit 24.

The learning data obtaining unit 23 may obtain learning data necessary for a neural network model for classifying and recognizing data. For example, the learning data obtaining section 23 may obtain, as learning data, vehicle data and/or sample data to be input to the neural network model.

The model learning unit 24 may learn to have a criterion regarding how the neural network model classifies certain data using the obtained learning data. Here, the model learning unit 24 may train the neural network model (that is, the model learning unit 24 may cause the neural network model to learn) through supervised learning which uses at least part of the learning data as a criterion. Alternatively, the model learning unit 24 may train the neural network model through unsupervised learning that discovers a criterion by learning by itself using learning data without supervision. Also, the model learning unit 24 may train the neural network model through reinforcement learning using feedback on whether a result of determining a situation based learning is correct. Also, the model learning unit 24 may train the neural network model using a learning algorithm including error back-propagation or gradient decent.

When the neural network model is trained, the model learning unit 24 may store the trained neural network model in the memory. The model learning unit 24 may store the trained neural network model in a memory of a server connected to the AI device 20 via a wired or wireless network.

The data learning unit 22 may further include a learning data preprocessing unit (not shown) and a learning data selecting unit (not shown) to improve an analysis result of a recognition model or to save resources or time necessary for generating the recognition model.

The learning data preprocessing unit may preprocess the obtained data so that the obtained data may be used for learning for situation determination. For example, the learning data preprocessing unit may process the obtained data into a predetermined format so that the model learning unit 24 may use the obtained learning data to learn image recognition.

Further, the learning data selecting unit may select data required for learning from among the learning data obtained by the learning data obtaining unit 23 or the learning data preprocessed by the preprocessing unit. The selected learning data may be provided to the model learning unit 24. For example, the learning data selecting unit may detect a specific area of an image obtained through a camera of a vehicle and select, as learning data, only data for an object included in the specific area.

In addition, the data learning unit 22 may further include a model evaluating unit (not shown) to improve the analysis result of the neural network model.

The model evaluating unit may input evaluation data to the neural network model, and if an analysis result output from the evaluation data does not satisfy a predetermined criterion, the model evaluating unit may allow the model leaning unit 22 to learn again. In this case, the evaluation data may be predefined data for evaluating the recognition model. For example, if the number of pieces of evaluation data or a proportion of the evaluation data for which the analysis result is not correct, among the analysis results of the learned recognition model for the evaluation data exceeds a predetermined threshold value, the model evaluating unit may evaluate that the predetermined criterion is not satisfied.

The communication unit 27 may transmit an AI processing result from the AI processor 21 to an external electronic device.

In this case, if the AI device 21 is included in the network system, the external electronic device may include an edge computing device or a client device according to an embodiment of the present invention.

Although the AI device 20 shown in FIG. 6 is functionally divided into the AI processor 21, the memory 25, and the communication unit 27, the aforementioned components may be integrated into a single module and referred to as an AI module.

FIG. 7 illustrates a voice processing process performed in a cloud environment or a server environment.

FIG. 7 illustrates an example in which an overall operation of voice processing is performed in a cloud environment 720 although voice inputting is performed in the device 710. In contrast, FIG. 9 illustrates an example of on-device processing in which an overall operation of voice processing for processing to process the above-described input voice and synthesize the voice is performed in the device 70.

In FIGS. 7 and 9, the device environment 710 or 910 may be referred to as a client device, and the cloud environment 720 or 920 may be referred to as a server.

FIG. 7 is a schematic block diagram of a speech recognition device in a speech recognition system environment according to an embodiment of the present invention.

Various components are required to process a voice event in an end-to-end voice UI environment. A sequence for processing the voice event may perform signal acquisition and playback, speech preprocessing, voice activation, speech recognition, natural language processing, and finally, a speech synthesis process in which the device responds to the user.

The client device 710 may include an input module. The input module may receive a user input from the user. For example, the input module may receive the user input from a connected external device (e.g., microphone, keyboard, or headset). Also, for example, the input module may include a touch screen. Further, for example, the input module may include a hardware key located in a user terminal.

According to an embodiment, the input module may include at least one microphone capable of receiving speech of the user as a voice signal. The input module may include a speech input system and receive speech of the user as a voice signal through the speech input system. The at least one microphone may generate an input signal for audio input, thereby determining a digital input signal for speech of the user. According to an embodiment, a plurality of microphones may be implemented in an array. The array may be arranged in a geometric pattern, for example, a linear geometric shape, a circular geometric shape, or any other configuration. For example, for a certain point, an array of four sensors may be arranged in a circular pattern separated by 90 degrees to receive sound in four directions. In some implementations, the microphone may include spatially different arrays of sensors in data communication and include a networked array of sensors. The microphone may include omnidirectional or directional (e.g., shotgun) microphone.

The client device 710 may include a preprocessing module 711 preprocessing a user input (voice signal) received via the input module (e.g., microphone).

The preprocessing module 711 may include an adaptive echo canceller (AEC) function to cancel an echo included in the user voice signal input through the microphone. The preprocessing module 711 may include a noise suppression (NS) function to cancel background noise included in the user input. The preprocessing module 711 may include an end-point detect (EPD) function to detect an end point of a user voice and locate a part where the user voice exists. In addition, the preprocessing module 711 may include an automatic gain control (AGC) function to adjust the volume of the user input so as to be suitably recognized and processed.

The client device 710 may include a voice activation module 712. The voice activation module 712 may recognize a wake up command that recognizes a call from the user. The voice activation module 712 may detect a certain keyword (e.g., Hi LG) from a user input that has undergone a preprocessing process. The voice activation module 712 exists in a standby state to perform an always-on keyword detection function.

The client device 710 may transmit the user voice input to the cloud server 720. The automatic speech recognition (ASR) and natural language understanding (NLU) operations, which are key components for processing user speech, are traditionally performed in the cloud due to computing, storage, and power constraints. The cloud may include the cloud device 720 that processes the user input transmitted from a client. The cloud device 720 may exist in a server form.

The cloud device 720 may include an automatic speech recognition (ASR) module 721, an AI module 722, a natural language understanding (NLU) module 723, a text-to-speech (TTS) module 724, and an NLU processing model 725.

The ASR module 721 may convert THE user voice input received from the client device 710 into text data.

The ASR module 721 includes a front-end speech preprocessor. The front-end speech preprocessor extracts representative features from a speech input. For example, the front-end speech preprocessor extracts a spectral feature that characterizes the speech input as a sequence of representative multi-dimensional vectors by performing Fourier transform on the speech input. In addition, the ASR module 721 may include one or more speech recognition models (e.g., acoustic model and/or language model) and may implement one or more speech recognition engines. Examples of the speech recognition model include a hidden Markov models, a Gaussian-mixture model, a deep neural network model, an n-gram language model, and other statistical models. Examples of the speech recognition engine include a dynamic time warping-based engine and a weighted finite state transformer (WFST)-based engine. The one or more speech recognition models and the one or more speech recognition engines may be used to process the extracted representative features of the front-end speech preprocessor to generate intermediate recognition results (e.g., phonemes, phoneme strings, and sub-words), and ultimately text recognition results (e.g., words, word strings, or sequence tokens).

When the ASR module 721 generates a recognition result including a text string (e.g., words, or sequence of words, or sequence of tokens), the recognition result is delivered to the NLU module 723 to infer an intent. In some instances, the ASR module 721 generates a plurality of candidate text representations of the speech input. Each candidate text representation is a sequence of words or tokens corresponding to the speech input.

The NLU module 723 may perform a syntactic analysis or a semantic analysis to recognize the user's intent. The grammatical analysis may divide grammar units (e.g., words, phrases, morphemes, etc.) and recognize what grammatical elements the divided units. The semantic analysis may be performed using semantic matching, rule matching, formula matching, or the like. Accordingly, the NLU module 723 may obtain a domain, an intent or a parameter necessary for representing the intent of the user input.

The NLU module 723 may determine a user's intent and a parameter using the matching rule divided into a domain, an intent, and a parameter necessary for recognizing the intent. For example, one domain (e.g., an alarm) may include a plurality of intents (e.g., alarm setting, alarm release), and one intent may include a plurality of parameters (e.g., time, number of times, alarm sound, etc.). The plurality of rules may include, for example, one or more mandatory element parameters. The matching rule may be stored in an NLU database.

The NLU module 723 recognizes a meaning of a word extracted from a user input by using a linguistic feature (e.g., a grammatical element) such as a morpheme, a phrase, and the like, and determines a user's intent by matching the recognized meaning of the word to the domain and the intent. For example, the NLU module 723 may determine the user's intent by calculating how many words extracted from the user input are included in each domain and intent. According to an embodiment, the NLU module 723 may determine the parameters of the user input using words as a base of the recognizing the intent. According to an embodiment, the NLU module 723 may determine the user's intent using a natural language recognition database storing a linguistic feature for recognizing an intent of the user input. Also, according to an embodiment, the NLU module 723 may determine the user's intent using a personalized language model (PLM). For example, the NLU module 723 may determine the user's intent using personalized information (e.g., a contact list, a music list, schedule information, social network information, etc.). The personalized language model may be stored in, for example, the natural language recognition database. According to an embodiment, not only the NLU module 723 but also the ASR module 721 may recognize the user's voice by referring to the personalized language model stored in the natural language recognition database.

The NLU module 723 may further include a natural language generating module (not shown). The natural language generating module may change designated information into a text form. The information changed into the text form may be in the form of speech of a natural language. The designated information may include, for example, information on an additional input, information to guide completion of an operation corresponding to the user input, or information to guide an additional input of the user. The information changed into the text form may be transmitted to the client device and displayed on a display or may be transmitted to the TTS module and changed into a voice form.

The TTS module 724 may change the information in the text form into information in a voice form. The TTS module 724 may receive the information in the text form from the natural language producing module of the NLU module 723 and convert the information in the text form into information in the voice form and transmit the same to the client device 710. The client device 710 may output the information in the voice form through a speaker.

The TTS module 724 synthesizes a speech output on the basis of the provided text. For example, a result generated in the ASR module 721 is in the form of a text string. The TTS module 724 converts the text string into an audible speech output. In order to generate a speech output from the text, the TTS module 724 uses an appropriate speech synthesis technique to generate speech output from the text, including concatenative synthesis, unit selection synthesis, diphone synthesis, domain-specific synthesis, formant synthesis, articulatory synthesis, hidden Markov model (HMM)-based synthesis, and sinewave synthesis, but is not limited thereto.

In some examples, the TTS module 724 is configured to synthesize individual words on the basis of a phoneme string corresponding to words. For example, the phoneme string is associated with a word of the generated text string. The phoneme string is stored in metadata associated with a word. The TTS module 724 is configured to directly process the phoneme strings in the metadata to synthesize words of a speech type.

Since the cloud environment generally has more processing capability or resources than the client device, it is possible to obtain higher quality speech output than actual in the client side synthesis. However, the present invention is not limited thereto and the voice processing process may be performed in the edge environment or on the client side (see FIGS. 8 and 9).

According to an embodiment of the present invention, the cloud environment may further include the AI module 722. The AI module 722 may be designed to perform at least some of the functions performed by the ASR module 721, the NLU module 722 and/or the TTS module 724 described above. The AI module 722 may also contribute to performing the independent functions of each of the ASR module 721, the NLU module 722, and/or the TTS module 724.

The AI module 722 may perform the functions described above through deep learning. The deep learning represents certain data into a form that a computer recognizes it (e.g., pixel information is represented as a column vector in the case of an image), and many researches (into how a better representation technique is to be created and how a model for learning the representation techniques is to be created) have been conducted to apply it to learning, and as a result of these efforts, various deep learning techniques such as deep neural networks (DNN), convolutional deep neural networks (CNN), recurrent Boltzmann machine (RNN), restricted Boltzmann machine (RBM) deep belief networks (DBN), deep-Q-network, may be applied to fields such as computer vision, speech recognition, natural language processing, voice/signal processing, and the like.

Currently, all the major commercial speech recognition systems (MS Cortana, Skype Translator, Google Now, Apple Siri, etc.) are based on the deep learning techniques.

In particular, the AI module 722 performs various natural language processing processes such as machine translation, emotion analysis, and information retrieval using the deep artificial neural network structure in the natural language processing field.

Meanwhile, the cloud environment may include an NLU model generating unit 725 for processing natural language understanding that may collect various personalized information and support the functions of the AI module 722.

The NLU model generating unit 725 may receive a user's voice sample from the client device 710 through the cloud environment. The NLU model generating unit 725 may generate an NLU model using the user's voice sample and numerous voice data collected in the cloud environment.

The NLU model generating unit 725 of the cloud environment may generate a model for each of all words on the assumption that it does not know a word that the user speaks. In this case, the size of the neural network may be significantly increased.

Thus, according to an embodiment of the present invention, the NLU model generated in the cloud environment may be compressed according to a certain criterion (e.g., a user's voice usage pattern) to reduce the model size.

Meanwhile, the personalized information collected by the AI agent 722 in the cloud environment is not limited to the voice of the user. For example, the personalized information may include at least one of data (calendar application, messaging service, music application usage, etc.), at least one sensing data (e.g., camera, microphone, temperature, humidity, gyroscope sensor, C-V2X, pulse, ambient light, iris scan, etc.) collected by the client device 710 and/or the cloud 720, and off-device data not directly related to the client device 710. For example, the personalized information may include maps, SMS, news, music, stock, weather, and wikipedia information.

Although the AI module 722 is represented as a separate block so as to be distinguished from the ASR module 721, the NLU module 723, and the TTS module 724 for convenience of description, but the AI module 722 may perform at least some or all of the functions of each module 721, 723, and 724.

FIG. 8 is a block diagram illustrating a voice processing operation between a client and an edge according to an embodiment of the present invention.

Referring to FIG. 8, a client device 810 may include a voice activation module 811 and a TTS module 812. An edge device 820 may include an ASR module 822, an NLU model storage unit 823, and an NLU module 824.

The cloud compresses an NLU model according to a certain criterion and delivers the compressed NLU model to the edge device 820. Thus, the edge 820 may store the NLU model 823.

The client device 810 may receive a voice input through at least one voice input unit via the vice activation module 811 and transmit the received voice data to the edge device 820. The ASR module 822 may perform speech recognition on the received voice data to convert the voice data into text. The NLU module 824 may perform NLU processing using the NLU model stored in the NLU model storage unit 823. When the natural language processing operation is completed through the NLU module 824, the edge device 820 may transmit a result of the speech recognition processing to the client device 820 through a wireless communication unit.

The client device 810 may perform speech synthesis on the received result of speech recognition through the TTS module 812 and output a resultant speech.

In FIG. 8, the process of speech recognition between the client device and the edge device is exemplarily described, but the present invention is not limited thereto. For example, the NLU model generated in the cloud may be a personalized NLU model generated according to a user's voice usage pattern, and in the cloud, a model having a large size may be compressed according to a certain standard and transmitted to the client as well as to the edge device.

FIG. 9 is a block diagram illustrating an operation of processing voice between a client and a cloud according to an embodiment of the present invention.

Referring to FIG. 9, a client device 910 includes a voice activation module 911, an ASR module 912 for a speech recognition operation, an NLU model storage unit 913, an NLU module 914, and a TTS module 914.

The cloud compresses the NLU model according to certain standard and delivers the compressed NLU model to the client device 910. Accordingly, the client device 910 may store the NLU model in the NLU model storage unit 913.

The client device 910 may receive a voice input through at least one voice input unit via the voice activation module 911. The ASR module 912 may perform speech recognition on the received voice data to convert the voice data into text. The NLU module 914 may perform natural language understanding processing using the NLU model stored in the NLU model storage unit 913. When the natural language processing operation is completed through the NLU module 914, the client device 910 delivers a result of speech recognition to the TTS module 915. The TTS module 915 may perform speech synthesis through a voice synthesis process and output the synthesized voice through an audio output unit.

FIG. 9 illustrates an example in which a voice processing process is performed in an on-device environment. In some cases, a client device 910 may perform a speech recognition operation by applying an NLU model and a voice synthesis operation may also be performed in a voice synthesis apparatus separated from the client device 910.

FIG. 10 is a data flowchart for implementing an adaptive speech recognition method on a cloud-distributed network system according to an embodiment of the present invention.

Referring to FIG. 10, a client may transmit a input user voice sample to a cloud (S1000).

The cloud generates an NLU model through AI processing (S1100). The AI processing may be implemented through an AI processor, AI system, AI module, AI device, or the like included in the cloud. Hereinafter, it is assumed that AI processing in the cloud is performed in the AI processor.

The AI processor in the cloud may analyze a user's voice pattern from user's voice data received from a client. For example, the AI processor may analyze the voice pattern of the user to define a certain rule on the basis of voice instructions that the user frequently uses. The cloud may analyze voice data having a tone or sound similar to the voice sample of the user on the basis of the rule, among a large number of voice data collected in the cloud. That is, a plurality of other user terminals than a terminal of a specific user may be connected to the cloud mentioned in an embodiment of the present invention, so that voice data may be collected. The voice data collected in the cloud may be classified according to certain criteria such as age, sex, area, and occupation.

Further, in order to generate the NLU model, a preprocessing process such as data preparation, model selection, hyper parameter setting, and the like, is required for the voice data collected in the cloud. In the present invention, automated machine learning may be used for the preprocessing process.

Automated machine learning is a process of automating end-to-end processes that apply machine learning to real problems. Data preprocessing, feature engineering, parameter extraction, and a parameter selecting method are applied to a data set to be used for machine learning. Through the preprocessing process, the AI processor may maximize final prediction performance of a machine learning model by performing algorithm selection and hyper parameter optimization.

Data preparation in the preprocessing process is a process of manipulating a large number of raw voice data collected in the cloud, for NLU model learning.

Model Selection is a process of selecting a model to be used for NLU model learning and a process of selecting a statistical model from a candidate model set to which the collected voice data is given.

The hyper parameter setting process is a process of extracting an optimal parameter. The hyper parameter optimization may locate a hyper parameter that generates an optimal model minimizing a predefined loss function in given test data.

In the case of the adaptive speech recognition method according to the embodiment of the present invention, the AI processor in the cloud environment may perform the preprocessing process described above on a large number of collected voice data by applying automatic machine learning (S1110). A detailed description of applying automatic machine learning in the process of generating an NLU model through machine learning will be described with reference to FIGS. 11 and 12.

The AI processor may extract an optimal hyper parameter through automatic machine learning (S1120).

The AI processor may train the NLU model by applying the extracted hyper parameters to a deep learning process (S1130). The AI processor trains the NLU model with a predetermined criterion (user's tone color, tone, etc.).

The AI processor may generate a final NLU model through the learning process (S1140).

Meanwhile, the AI processor may compress the NLU model on the basis of voice commands frequently used in the client terminal or the edge device through a model compression process (S1150).

The compressed NLU model is an NLU model capable of performing speech recognition processing on the user who frequently uses the edge device and a voice pattern frequently used by the user. Through the compressed NLU model, the edge device may drive the NLU model with small processing power.

The cloud may transmit the compressed NLU model to the edge device (S1200). Here, data transmitted to the edge device may include at least one of the NLU model, a parameter required for using the NLU model, and a hyper parameter required for using the NLU model.

The edge device may store the NLU model received from the cloud in the storage unit. Once the edge device is able to use the NLU model in the speech recognition processing process, the edge device may directly perform a speech recognition operation with the client without involvement of the cloud. As a result, the occurrence of network overhead (latency) may be minimized.

Accordingly, when the client receives the voice command again, the voice input of the user may be transmitted to the edge device.

The edge device may perform a speech recognition operation on the voice data received from a client using the NLU model (S1400).

The edge device may transmit a speech recognition result according to the speech recognition operation to the client device (S1500). Accordingly, when a voice command is input to the client device in a voice pattern frequently used by the user, the process of network communication with the cloud is not necessary in the speech recognition process, and thus, efficiency of real-time speech recognition may be enhanced.

FIGS. 11 to 12 illustrate a process of generating an NLU model by applying Auto ML.

Referring to FIG. 11, voice data collected in the cloud may include all voice data collected from a network area of the cloud, in addition to data collected through a specific user terminal.

For example, the voice data collected in the cloud may be a total of 300,000 data, and Auto ML may perform data preparation by applying predetermined criteria to the 300 million data. The predetermined criteria may be filtered by age, sex, and area.

For example, the Auto ML may identify sex for the collected data through supervised learning. For example, referring to FIG. 12, Auto ML may identify sex of voice data collected in the cloud by applying a learning model trained to classify input data into male and female. Accordingly, when voice data of the user is applied to the generated NLU model, a sex may be identified on the basis of the input data.

Accordingly, the AI processor may classify all the input data (e.g., 300 million) collected in the cloud by age (Input_year_20, Input_year_40, Input_year_60) to filter them into 50 pieces of data for less than 20s, 50 pieces of data for less than 40s, and 50 pieces of data for less than 60s. In the same manner, all the input data collected in the cloud may be classified by sex (Input_Sex_Male, Input_Sex_Female) to filter them into 20 pieces of data for men and 20 pieces of data for women. Further, all the input data collected in the cloud may be classified by area (Input_Country_A, Input_Country_B, Input_Country_C) to filter them into 50 pieces of data for area A, 50 pieces of data for area B, and 50 pieces of data for area C. As a result, the AI processor may sample up to 2.25 million pieces of all input data collected in the cloud through Auto ML.

The AI processor may learn by using the sampled 2.25 million pieces of voice data as input data of the NLU learning model. Here, a voice sample of the user may be applied in the learning process. Further, the AI processor may compress the size of the NLU model by analyzing the voice pattern of the user collected from the client as described above. Compressing the size of the NLU model may be a process of reducing the number of words available for speech recognition through the NLU model. That is, if all the words spoken by the user collected in the cloud environment are to be applied to the model, a processing to the edge device itself is impossible as the size of the neural network increases.

FIG. 13 is a data flowchart for applying an adaptive speech recognition method according to an embodiment of the present invention.

According to an embodiment of the present invention, a speech recognition process for a voice command input to the client device may be adaptively performed in the edge device or the cloud server.

Referring to FIG. 13, the client may transmit the input voice data of the user to an edge device (S1300). The edge device may include an ASR module, and the ASR module may convert the received voice data into text (S1310).

The edge device may determine whether there is an NLU model capable of processing a speech recognition operation on the converted text (S1320). If it is determined that the NLU model exists, the edge device may perform a speech recognition operation using the NLU model (S1340) and transmit a speech recognition result to the client device.

If it is determined that the NLU model does not exist, the edge device may transmit the voice data (input voice) of the user received from the client device to the cloud (S1330). The cloud may perform the speech recognition operation using a previously generated NLU model (S1360) and directly transmit a speech recognition result to the client (S1370).

Therefore, when a voice pattern frequently used by the user is input, there is a high possibility that an NLU model already exists, and thus, the edge device may perform real-time speech recognition processing by applying the NLU. However, in the case of a voice command first input to the client device or a voice command which is not frequently used, speech recognition processing may be performed through the cloud server.

Also, according to an embodiment of the present invention, the voice data of the user transferred to the edge device may be periodically monitored. The edge device may request the cloud to update the NLU model if the NLU model cannot be applied to the input voice command but the voice command is repeatedly used periodically as a result of monitoring or if the number of times the voice command is used exceeds a predetermined reference. The cloud may update the NLU model in response to the request for updating the NLU mode from the edge device. The cloud may transmit the updated NLU model to the edge device.

The above-described present invention can be implemented with computer-readable code in a computer-readable medium in which program has been recorded. The computer-readable medium may include all kinds of recording devices capable of storing data readable by a computer system. Examples of the computer-readable medium may include a hard disk drive (HDD), a solid state disk (SSD), a silicon disk drive (SDD), a ROM, a RAM, a CD-ROM, magnetic tapes, floppy disks, optical data storage devices, and the like and also include such a carrier-wave type implementation (for example, transmission over the Internet). Therefore, the above embodiments are to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. A speech recognition method in an edge computing device in a distributed network system including a client device, the edge computing device, and a cloud server, the speech recognition method comprising:
receiving voice data spoken by a user from the client device;
based on the voice data being received from the client device, performing an auto speech recognition (ASR) operation;
determining whether a natural language understanding (NLU) model exists on the edge computing device, wherein the NLU model is configured to apply NLU understanding on generated text based on the ASR operation;
based on a determination that the NLU model exists on the edge computing device, performing a natural language processing operation on the received voice data using the NLU model;
based on a determination that the NLU model does not exist on the edge computing device, transmitting the received voice data to the cloud server and receiving, from the cloud server, a result of the natural language processing operation on the received voice data using a previously generated NLU model; and
transmitting a result of the natural language processing operation to the client device.

2. The speech recognition method of claim 1, wherein the NLU model is a user-personalized NLU model generated by analyzing a voice command pattern of the user.

3. The speech recognition method of claim 2, wherein the NLU model is generated by the cloud server and then received from the cloud server as having a size in a compressed state on the basis of the voice command pattern of the user.

4. The speech recognition method of claim 1, wherein the edge computing device comprises an artificial intelligence (AI) module, and
the ASR operation and the natural language processing operation are performed through the AI module.

5. The speech recognition method of claim 1, further comprising:
performing an initial access procedure with the client device by periodically transmitting a synchronization signal block (SSB);
performing a random access procedure with the client device;
transmitting an uplink (UL) grant to the client device for scheduling transmission of the voice data; and
receiving the voice data from the client device on the basis of the UL grant.

6. The speech recognition method of claim 5, wherein the performing of a random access procedure comprises:
receiving a physical random access channel (PRACH) preamble from the client device; and
transmitting a response to the PRACH preamble to the client device.

7. The speech recognition method of claim 6, further comprising:
performing a downlink beam management (DL BM) procedure using the SSB.

8. The speech recognition method of claim 7, wherein the performing of a DL BM procedure comprises:
transmitting a CSI-ResourceConfig IE including a CSI-SSB-ResourceSetList to a user equipment (UE);
transmitting a signal on SSB resources to the client device; and
receiving a best SSBRI and a corresponding RSRP from the client device.

9. The speech recognition method of claim 5, further comprising:
transmitting configuration information of a reference signal related to beam failure detection to the client device; and
receiving a PRACH preamble requesting beam failure recovery from the client device.

10. A method for generating a natural language understanding (NLU) model in a cloud server in a distributed network system including a client device, an edge computing device, and the cloud server, the method comprising:
receiving voice data spoken by a user from the client device;
defining a rule for generating an NLU model by analyzing a voice pattern of the user from the voice data;

training the NLU model using a plurality of pieces of voice data collected in the cloud server on the basis of the rule, as input data;

generating the NLU model according to a training result;

compressing the NLU model to a predetermined size according to the voice pattern of the user;

transmitting the compressed NLU model to the edge computing device;

based on second voice data being received from the client device, performing an auto speech recognition (ASR) operation;

determining whether the compressed NLU model exists on the edge computing device, wherein the NLU model is configured to apply NLU understanding on generated text based on the ASR operation;

based on a determination that the compressed NLU model exists on the edge computing device, performing a natural language processing operation on the received second voice data using the compressed NLU model; and based on a determination that the compressed NLU model does not exist on the edge computing device, transmitting the received second voice data to the cloud server and receiving, from the cloud server, a result of the natural language processing operation on the received second voice data using a previously generated NLU model.

11. The method of claim 10, wherein the training of the NLU model is performed through automated machine learning AutoML, and the AutoML comprises:

performing a preprocessing process on the plurality of pieces of voice data collected in the cloud server; and generating the input data for training the NLU model by classifying the plurality of pieces of voice data collected in the cloud server as a result of the preprocessing according to a predetermined criterion.

12. The method of claim 11, wherein the predetermined criterion comprises attribute information of each of the plurality of pieces of voice data collected in the cloud server, and the attribute information includes at least one of age, sex, and area.

13. A speech recognition system comprising:

a cloud server configured to receive first voice data spoken by a user from a client device and to generate a natural language understanding (NLU) model based on a rule defined on the basis of a voice pattern of the user analyzed from the first voice data; and an edge computing device configured to:

receive second voice data spoken by the user from the client device;

based on the second voice data being received from the client device, performing an auto speech recognition (ASR) operation;

determining whether the NLU model exists on the edge computing device, wherein the NLU model is configured to apply NLU understanding on generated text based on the ASR operation; and based on a determination that the NLU model exists on the edge computing device, perform a natural language processing operation on the received second voice data using the NLU model; and based on a determination that the NLU model does not exist on the edge computing device, transmit the received second voice data to the cloud server and receiving, from the cloud server, a result of the natural language processing operation on the received second voice data using a previously generated NLU model.

14. A non-transitory computer-readable medium storing a computer-executable component configured to be executed in one or more processors of a computing device, wherein the computer-executable component is configured to:

receive voice data spoken by a user from a client device, define a rule for generating a natural language understanding (NLU) model by analyzing a voice pattern of the user from the voice data, train the NLU using a plurality of pieces of voice data collected in a cloud server on the basis of the rule as input data, generate the NLU model according to a training result, compress the NLU model to a predetermined size according to the voice pattern of the user, transmit the compressed NLU model to an edge computing device, based on second voice data being received from the client device, perform an auto speech recognition (ASR) operation;

determine whether the compressed NLU model exists on the edge computing device, wherein the NLU model is configured to apply NLU understanding on generated text based on the ASR operation;

based on a determination that the compressed NLU model exists on the edge computing device, perform a natural language processing operation on the received second voice data using the compressed NLU model; and based on a determination that the compressed NLU model does not exist on the edge computing device, transmit the received second voice data to the cloud server and receive, from the cloud server, a result of the natural language processing operation on the received second voice data using a previously generated NLU model.

* * * * *